Patented June 14, 1938

2,120,640

UNITED STATES PATENT OFFICE 2,120,640

DISPENSING CONGEALED FOODSTUFFS

Richard A. Craemer, Los Angeles, Calif.

No Drawing. Application April 20, 1935,
Serial No. 17,489

4 Claims. (Cl. 99—171)

This invention relates to a method and container for dispensing materials. It is especially applicable to the dispensing of food products including frozen edible foodstuffs such as ice cream products, ices, sherbets, frozen candies and other confectioneries.

An object of my invention is to provide a method for dispensing the contents of a container which will allow the dislodging thereof with a minimum of loss due to adhesion to the interior container wall in contact with the stored material. It is another object of my invention to present a simple and efficient method for discharging frozen edible materials from a container at practically any temperature at which it is deemed desirable without necessity of warming the outside of the container to melt a portion of the frozen material in direct contact with the inside wall thereof. It is another object of my invention to present a container by means of which this efficient dislodging of the contents may be brought about. Other objects of my invention will be apparent from the description given hereinafter.

The usual containers for ice cream and other frozen food products which are at present being used for immediate dispensing by the consumer and which consist of a receptacle constructed of fibrous materials such as paper, cardboard, parchment or other flexible or semi-rigid materials, do not allow removal of the frozen contents thereof without substantial portions adhering to the walls of the container. The same difficulties of adhesion to the walls are encountered in connection with the several metal- or metallic receptacles for frozen foodstuffs now in use. The term "metal- or metallic receptacle" is meant to include the various molds used in molding ice cream or similar materials into forms for the purpose of increasing its attractiveness to the consumer. Under present practice, it is practically impossible to discharge the frozen contents from the mold without heating its exterior or applying such a severe force to the mold that breakage or damage thereto is practically unavoidable.

The above mentioned difficulties are especially inherent in the case of the receptacles consisting of a casing formed by shaping and sealing, glueing or crimping (at sides or one extremity or both) the aforesaid fibrous materials and from which the ice cream or other frozen foodstuffs are expelled by collapsing the sides of the container or by exerting an upward pressure upon a loose bottom of a container causing the latter to move upwardly within the walls thereof, and in doing so, expelling the frozen foodstuff contained therein at its top. It likewise applies to containers of the type described in United States Patent 1,932,169, issued October 24, 1933, to Charles F. Allen and Selwyn Smith in which the frozen foodstuff is made available for consumption by a gradual unwinding of the helically wound casing constructed out of paper or other flexible sheet material. While a slight heating of these containers will allow a more ready removal of the contents in a number of instances, such a process is inconvenient and more or less wasteful and will not prevent the loss of contents due to adhesion to the interior as referred to above.

I have discovered that all of the disadvantages referred to above may be eliminated by coating the inside of a container for frozen edible foodstuffs prior to the introduction thereof in the container with a substance, mixture or solution which is uncongealed and will be uncongealed in the presence of the material stored or to be stored within such a container at the time of dispensing, such as solutions of sugars, alcohols or salts or substances such as oils or glycerine as hereinafter more fully set forth. By so doing, these congealed materials may be removed from the container substantially as a unit without adhesion of any portions thereof to its interior section and without necessity of having to heat the outside of the container to allow a dislodging of its contents by melting a portion thereof.

These coating compositions may or may not penetrate into the pores of the container, depending upon the nature of the material used in its construction. Most of them are naturally substantially immiscible with the congealed materials stored therein and usually show a preferential adhesion for the particular material used in constructing the container or casing. However, an intrusion of any of the coating compositions used in my invention into the foodstuff itself will not detract from its consumability or value or taste. Their action is comparable to that of a lubricant in allowing a more ready and more complete separation between the congealed materials and the walls of the container in which such materials are stored because of the fact that they are in an uncongealed state at the temperature prevailing within the contents when ready for dispensing.

Typical coating compositions adapted to perform the functions set out above are: Solutions of a sugar or mixture of sugars comprising a palatable alcohol, such as ethyl alcohol, glycol, or glycerine and an optimum amount of water as hereinafter defined, solutions of a sugar or mixture of sugars in water, sufficient sugar being incorporated in the water to depress the freezing point of the solution so created substantially below that of water (for instance below 15° F.) and to give the solution a viscosity sufficiently high to cause proper adherence to the walls of the container to which they are to be applied; various oils of vegetable origin such as walnut oil, sunflower oil or poppy seed oil; various highly refined mineral oils of a paraffinic nature, known to the art as "White Oils" or "Crystal Oils" and sold under various trade names such as "Nujol", "Wyrol" etc. In addition to the above, glycerine itself may be used. In certain instances, it may be desirable to introduce a salt into the herein mentioned coating compositions of which water is one of the ingredients. For instance, into a solution comprising a substantial amount of sugar (about 50% or more) I may incorporate an amount of ordinary table salt sufficient to lower the congealing point of the solution without creating a composition which would be unpalatable or undesirable. Such a salt should be one which is not subject to hydrolysis and which is ionized to a substantial extent so as to produce the maximum amount of freezing point lowering per mole of salt added.

In preparing the solutions of a sugar or a mixture of sugars in a palatable alcohol and water, sufficient amounts of the sugar or sugar mixture and alcohol are added to the water to produce a liquid having a congealing point substantially below that of water and which will not congeal in the presence of the congealed foodstuffs at the time of dispensing. In case the viscosity of the water, sugar and alcohol solution is too low to be suitable for application to the interior of the container, I may add a small amount of a jellifying agent such as gelatin, gum arabic or the like. Such agent may be added to any of the water-containing preparations mentioned herein and will exercise the same function as in the water, sugar and alcohol solution. The principal purpose of the alcohol in the above mixture is to reduce the congealing temperature of the liquid coating composition. While it may be preferable to use an alcohol in most instances, it is not deemed an essential ingredient, and may be omitted. Solutions of low congealing points may be readily obtained by merely dissolving suitable amounts of a sugar or a mixture of sugars in water. The phenomenon of freezing point lowering of water by the addition of sugar and/or alcohol is well known and the manufacture of a solution of proper consistency for application to the inside of the container and having a desired low freezing point may be readily carried out by one skilled in the art. In all instances, sufficient water should be present in the alcohol-water mixture to insure the proper and lasting solution of the sugar. In the hereinafter cited examples a few typical sugar and water-, or sugar, alcohol and water solutions have been illustrated. The compositions given therein are merely illustrative of the general type of solution and are not to be deemed as limitations.

The oils herein mentioned are readily applicable by themselves. The so-called "White Oils" of petroleum origin, sometimes labeled "Crystal Oils" or sold under various trade names such as "Nujol" are very desirable. Their congealing points (pour points) are usually well below 0° centigrade, they are tasteless and odorless and may be readily and evenly spread over the inside of any container to be used for dispensing ice cream or similar substances. A typical oil of this nature has been disclosed in an example given hereinafter. It is to be understood that some of the various characteristic properties of such mineral oils, for instance gravity or flash point, may vary between more or less wide limits without changing their applicability for the purpose of this invention. Their chief characterizing features for their present purpose are: color (usually water white or approximately so) and a highly paraffinic nature, manifested by a high unsulphonatable residue. Their wax content is low, allowing them to remain fluid at temperatures substantially below 0° C.

An inspection of the congealing points of the hereinbefore mentioned vegetable oils will readily indicate their applicability for coating containers in which congealed edible foodstuffs are to be stored:

Walnut oil—congeals at —27° C.
Sunflower oil—congeals at —18° C.
Poppyseed oil—congeals at —18° C.

In addition to the above mentioned oils, any vegetable oil from which the stearine and similar compounds responsible for high congellation have been removed, may be used.

From a large number of experiments recently conducted, it appeared that the oils mentioned above and especially the white petroleum oils constitute my preferred coating compositions for the purposes set forth herein. They may be applied to any type of container and operate equally efficiently independently of the material used in constructing the container. They are especially well adapted for use in connection with metal containers especially in those instances where the interior thereof has become coated with grease either from the frozen foodstuffs previously stored therein or from some extraneous source. Additionally, they may be applied to containers constructed out of paraffined and sized fibrous materials or to containers constructed of various water repellent fibrous materials now being used for storing and dispensing ice cream or similar frozen foodstuffs such as ices, ice milk etc. The low freezing point liquid coating compositions mentioned previously and in which water is one of the ingredients are not so well applicable to these types of containers on account of the fact that the adhesion of the coating composition to the interior of the container is impaired on account of the water repellent nature of the container material. This latter type of coating composition is, however, applicable to containers constructed out of untreated fibrous materials or to metal or metallic containers including metal or metallic molds free from any substantial amounts of adhering grease. The above also holds true for glycerin which in its coating properties is very analogous to the water-containing compositions mentioned above. The oils mentioned herein are also applicable to containers constructed out of untreated fibrous or porous material or to containers coated on the exterior surface with a water repellent material, such as paraffin. The aqueous solutions referred to above are also applicable to the last mentioned type of container.

The application of the coating compositions mentioned herein to the interior of the container for the frozen foodstuff may be performed in a variety of ways. In general, any method of applying coating compositions to a surface to be coated is applicable in coating the interior of the containers mentioned above for the purpose set forth herein. For instance, I may apply the coating composition by means of a brush, daub or similar spreading device, or with a spray gun or by applying a large excess thereof to the interior of the container and partially squeezing out or draining off the major portion of the composition, leaving only a thin film to cover the interior of the container. The coating need not be very thick. In general, one application of the coating composition is sufficient, although in cases where the container to be coated is constructed out of a highly absorbent material, such as a poorer grade of unglazed paper, a repetition of the coating process may be necessary. I may if so desired coat the pre-cast frozen foodstuff with any of the coating compositions mentioned herein and subsequently introduce it into the container. The coating composition will upon introduction of the congealed foodstuff distribute itself between it and the container walls just as if the latter had been coated as described above.

The term "interior" is meant to include the entire inner surface including top and bottom. However, in certain cases where deemed necessary, either the top or bottom or both need not be coated.

The containers may be filled with the frozen or semi-frozen foodstuff as hereinafter described, within a short interval or immediately after coating, or in the case of certain ones, such as the white mineral oils they may be allowed to stand for a few hours. However in such cases it is deemed desirable to protect the coated surfaces of the container to prevent the collection of dust thereon.

The following examples are intended to give a more detailed description of some of the compositions set forth above, as well as to illustrate their action.

*Alcohol-sugar-water solution*

A solution containing the following ingredients in the proportions set forth below:

| | Per cent |
|---|---|
| Sucrose | 40 |
| Corn sugar | 20 |
| Water | 30 |
| Glycerine | 10 | constituted a smooth syrup at 0° F. and was applied by means of a brush to the interior of a cardboard container having a loose bottom. This container was subsequently filled with ice cream and allowed to stand for twenty-four hours at a temperature well below 32° F. When on dispensing, the bottom of this container was pushed upwardly within the walls thereof, the entire amount of ice cream contained therein was expelled without any adhesion to the walls of the container or to the bottom thereof.

*Water-sugar solution*

A container similar to the one described above was coated with a solution containing:

| | Per cent |
|---|---|
| Sucrose | 47 |
| Invert sugar | 20 |
| Water | 33 |

This solution did not show any tendency toward crystallizing at 0° F. It was applied in a thin layer to the interior of the cardboard container and the container was filled with ice cream and allowed to stand for two days. When ready for delivery to the consumer, the ice cream stored in the container was expelled without loss due to adhesion, by pushing the loose bottom upwardly within the container.

*Oils*

The interior of a metal ice cream mold was coated by means of a brush with a mineral oil having the following properties:

| | |
|---|---|
| Gravity | 31° A. P. I. |
| Flash (Cleveland open cup) | 300° F. |
| Pour test | 0° F. |
| Color | Water white |
| Unsulphonatable residue | 99% |

The so coated mold was filled with a partially congealed ice cream and the congelation was completed by applying a suitable low temperature in a freezing chamber. After removal of the mold from the freezing chamber, it was possible to open the mold without any difficulty and to discharge the contents thereof intact. No adhesion of the ice cream in the crevices of the mold could be detected and no detectable melting of the charge of the mold could be observed after removal. No heating of the mold was necessary in order to expel its contents. Another mold, but uncoated, and which had been introduced into the freezing chamber at exactly the same time as the coated one and which was removed therefrom at substantially the same time could only be opened with great difficulty. In contrast to the molded ice cream removed from the oil coated mold, substantial portions of the charge adhered to the sides and cavities of the mold, resulting in an imperfect product. While this adhesion could perhaps be counteracted by heating the mold before opening, such a procedure is more or less wasteful and uneconomical. It is rendered entirely unnecessary when practicing my invention. Even in cases where the temperature of the oil coated mold and its frozen contents was in the neighborhood of 0° F. to 10° F., it could be opened without difficulty and its contents removed substantially as a unit.

Molds coated with other white mineral oils such as those obtainable under various trade names such as "Wyrol", "Nujol", "Crystal Oronite", "Marcol", "Amaline" and whose properties are substantially identical to the oil described in the above example, likewise allowed a dislodging of the ice cream contained therein as a unit.

The charging of the food or other material into the container of my invention may be carried out in various ways. For instance, I may coat the inside of the container with any suitable coating composition and insert therein the frozen mass pre-cast to a dimension approximating the interior of the container, or, if more desirable, I may introduce a cooled and semi-frozen mass into the coated container and complete the freezing afterwards by applying a suitable low temperature. When ready for consumption by the consumer, the frozen foodstuffs can be dislodged from the coated container substantially as a unit.

The method of discharging the contents may consist in applying a force upon a lower and movable extremity of the container, and thus moving it upwardly within its walls to discharge the material at the top, or by applying a collapsing force upon the walls of a container having a rigidly connected bottom, or by unwinding the helically wound sheet material such as paper of a container of the type described in Patent No. 1,932,169 referred to hereinbefore. Another method of dispensing ice cream has been previously referred to in connection with the molding thereof. In the case where mineral or vegetable oils are used in connection with fibrous containers, especially those in which the fibrous material is of low or intermediate quality, it may be desirable but not essential to precoat the interior of such containers with paraffin or similar acting materials before applying the low congealing point oils, so as to prevent the oil used in coating from working its way through to the outside of the container. However, in most instances this is unnecessary and such oils may be directly applied to a non-coated container, (especially in view of the fact that small quantities of the oil applied to the container will give the desired results).

In all instances a more complete removal of the contents is possible than with containers whose interior has not been coated with any of the compositions mentioned hereinbefore.

The term "ice cream" is meant to include ice cream coated with a grease base substance such as chocolate, caramel or the like.

By the term "sugar" I mean to include "sucrose" having the empirical formula $C_{12}H_{22}O_{11}$, as well as the more simple hexose sugars ($C_6H_{12}O_6$) exemplified by grape sugar, corn sugar and the like or mixtures thereof.

The term "container" is also meant to include one obtained by merely wrapping paper, parchment or similar sheet materials around a unit of a frozen foodstuff such as an "ice cream brick", "loaf" or the like. By coating the paper with one of the compositions mentioned herein (depending upon the nature of the paper) prior to wrapping it around the ice cream, the ice cream or similar frozen foodstuffs may be made available for consumption substantially as a unit and without adhesion of the frozen foodstuff, by a simple unwrapping process.

As to the properties of the mineral oil, i. e. gravity, flash point, unsulphonatable residue etc., reference is made to U. S. Bureau of Mines Technical paper 323 B revised October 21, 1927.

The various examples given herein are not intended as limitations of my invention. As to the scope thereof, reference is made to the appended claims.

I claim:

1. A package which contains food products which are liquid at normal temperatures but congealable into solid or semi-solid masses by refrigeration and which products are adapted to conform substantially to the shape of the walls of the package, said package having an adhesion preventing liquid coating applied to the surface of the inner walls thereof whereby said coating will be interposed as a relatively thin film between the walls of the package and product, and said coating having a solidifying temperature below the normal dispensing temperature of the product whereby said coating will remain liquid and permit removal of the congealed product without substantial adherence thereof to the coated surfaces of the package walls.

2. A package as set forth in claim 1 wherein the liquid coating is selected from the group consisting of low pour point mineral oils, vegetable oils, and solutions of palatable substances.

3. The method of overcoming the adhesion of frozen food products to the walls of the package in which the product is dispensed, said products being liquid at normal temperatures but congealable into solid or semi-solid masses by refrigeration, which consists in interposing a liquid film between the walls of the package and product, the film having the characteristic of being palatable and non-solidifying at the normal dispensing temperature of the product.

4. A package containing a water-bearing frozen food product which is liquid at normal temperatures and is congealed into a solid or semi-solid mass by refrigeration and conforms substantially to the shape of the walls of the package, said package having an adhesion-preventing film of material interposed between the walls of the package and the congealed food product, said adhesion-preventing film being liquid at ordinary temperatures and non-solidifying at the normal removing temperature of the congealed product whereby said film will be fluid at said normal removing temperature and will permit removal of the congealed food product without substantial adherence thereof to the adjacent surfaces of the walls of the package.

RICHARD A. CRAEMER.

CERTIFICATE OF CORRECTION.

Patent No. 2,120,640.   June 14, 1938.

RICHARD A. CRAEMER.

It is hereby certified that error appears in the printed specification of the above numbered patent requiring correction as follows: Page 3, second column, line 42, for "0° F. to 10°" read 0° F. to -10°; and that the said Letters Patent should be read with this correction therein that the same may conform to the record of the case in the Patent Office.

Signed and sealed this 11th day of July, A.D. 1939.

Henry Van Arsdale (Seal)   Acting Commissioner of Patents.

method of dispensing ice cream has been previously referred to in connection with the molding thereof. In the case where mineral or vegetable oils are used in connection with fibrous containers, especially those in which the fibrous material is of low or intermediate quality, it may be desirable but not essential to precoat the interior of such containers with paraffin or similar acting materials before applying the low congealing point oils, so as to prevent the oil used in coating from working its way through to the outside of the container. However, in most instances this is unnecessary and such oils may be directly applied to a non-coated container, (especially in view of the fact that small quantities of the oil applied to the container will give the desired results).

In all instances a more complete removal of the contents is possible than with containers whose interior has not been coated with any of the compositions mentioned hereinbefore.

The term "ice cream" is meant to include ice cream coated with a grease base substance such as chocolate, caramel or the like.

By the term "sugar" I mean to include "sucrose" having the empirical formula $C_{12}H_{22}O_{11}$, as well as the more simple hexose sugars ($C_6H_{12}O_6$) exemplified by grape sugar, corn sugar and the like or mixtures thereof.

The term "container" is also meant to include one obtained by merely wrapping paper, parchment or similar sheet materials around a unit of a frozen foodstuff such as an "ice cream brick", "loaf" or the like. By coating the paper with one of the compositions mentioned herein (depending upon the nature of the paper) prior to wrapping it around the ice cream, the ice cream or similar frozen foodstuffs may be made available for consumption substantially as a unit and without adhesion of the frozen foodstuff, by a simple unwrapping process.

As to the properties of the mineral oil, i. e. gravity, flash point, unsulphonatable residue etc., reference is made to U. S. Bureau of Mines Technical paper 323 B revised October 21, 1927.

The various examples given herein are not intended as limitations of my invention. As to the scope thereof, reference is made to the appended claims.

I claim:

1. A package which contains food products which are liquid at normal temperatures but congealable into solid or semi-solid masses by refrigeration and which products are adapted to conform substantially to the shape of the walls of the package, said package having an adhesion preventing liquid coating applied to the surface of the inner walls thereof whereby said coating will be interposed as a relatively thin film between the walls of the package and product, and said coating having a solidifying temperature below the normal dispensing temperature of the product whereby said coating will remain liquid and permit removal of the congealed product without substantial adherence thereof to the coated surfaces of the package walls.

2. A package as set forth in claim 1 wherein the liquid coating is selected from the group consisting of low pour point mineral oils, vegetable oils, and solutions of palatable substances.

3. The method of overcoming the adhesion of frozen food products to the walls of the package in which the product is dispensed, said products being liquid at normal temperatures but congealable into solid or semi-solid masses by refrigeration, which consists in interposing a liquid film between the walls of the package and product, the film having the characteristic of being palatable and non-solidifying at the normal dispensing temperature of the product.

4. A package containing a water-bearing frozen food product which is liquid at normal temperatures and is congealed into a solid or semi-solid mass by refrigeration and conforms substantially to the shape of the walls of the package, said package having an adhesion-preventing film of material interposed between the walls of the package and the congealed food product, said adhesion-preventing film being liquid at ordinary temperatures and non-solidifying at the normal removing temperature of the congealed product whereby said film will be fluid at said normal removing temperature and will permit removal of the congealed food product without substantial adherence thereof to the adjacent surfaces of the walls of the package.

RICHARD A. CRAEMER.

---

CERTIFICATE OF CORRECTION.

Patent No. 2,120,640.                          June 14, 1938.

RICHARD A. CRAEMER.

It is hereby certified that error appears in the printed specification of the above numbered patent requiring correction as follows: Page 3, second column, line 42, for "0° F. to 10°" read 0° F. to -10°; and that the said Letters Patent should be read with this correction therein that the same may conform to the record of the case in the Patent Office.

Signed and sealed this 11th day of July, A.D. 1939.

Henry Van Arsdale (Seal)                      Acting Commissioner of Patents.

CERTIFICATE OF CORRECTION.

Patent No. 2,120,640. June 14, 1938.

RICHARD A. CRAEMER.

It is hereby certified that error appears in the printed specification of the above numbered patent requiring correction as follows: Page 3, second column, line 42, for "0° F. to 10°" read 0° F. to -10°; and that the said Letters Patent should be read with this correction therein that the same may conform to the record of the case in the Patent Office.

Signed and sealed this 11th day of July, A.D. 1939.

Henry Van Arsdale (Seal) Acting Commissioner of Patents.